Feb. 19, 1946.   R. HODGES ET AL   2,395,121
DRILLING HEAD UNIT
Filed July 17, 1942   8 Sheets-Sheet 5

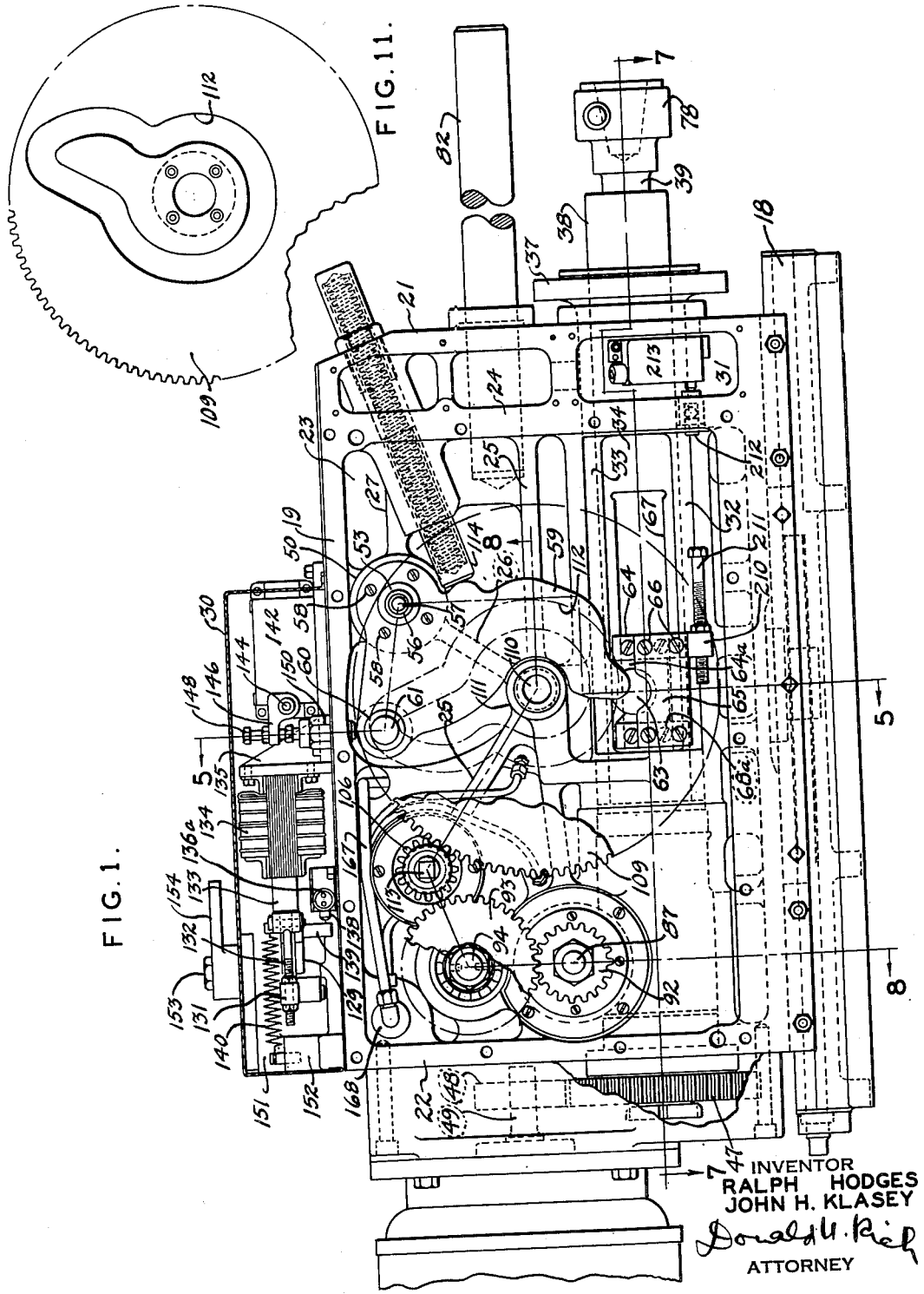

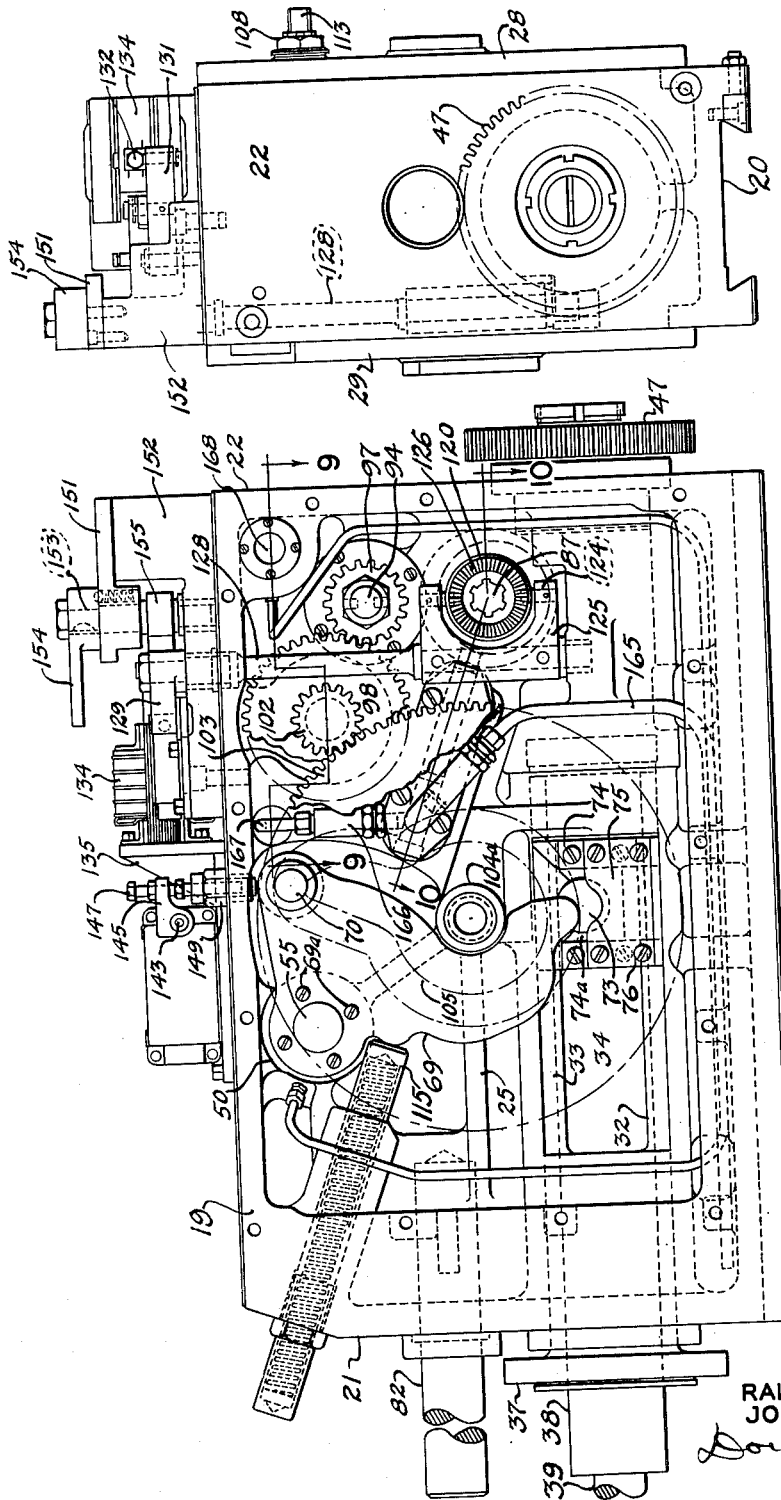

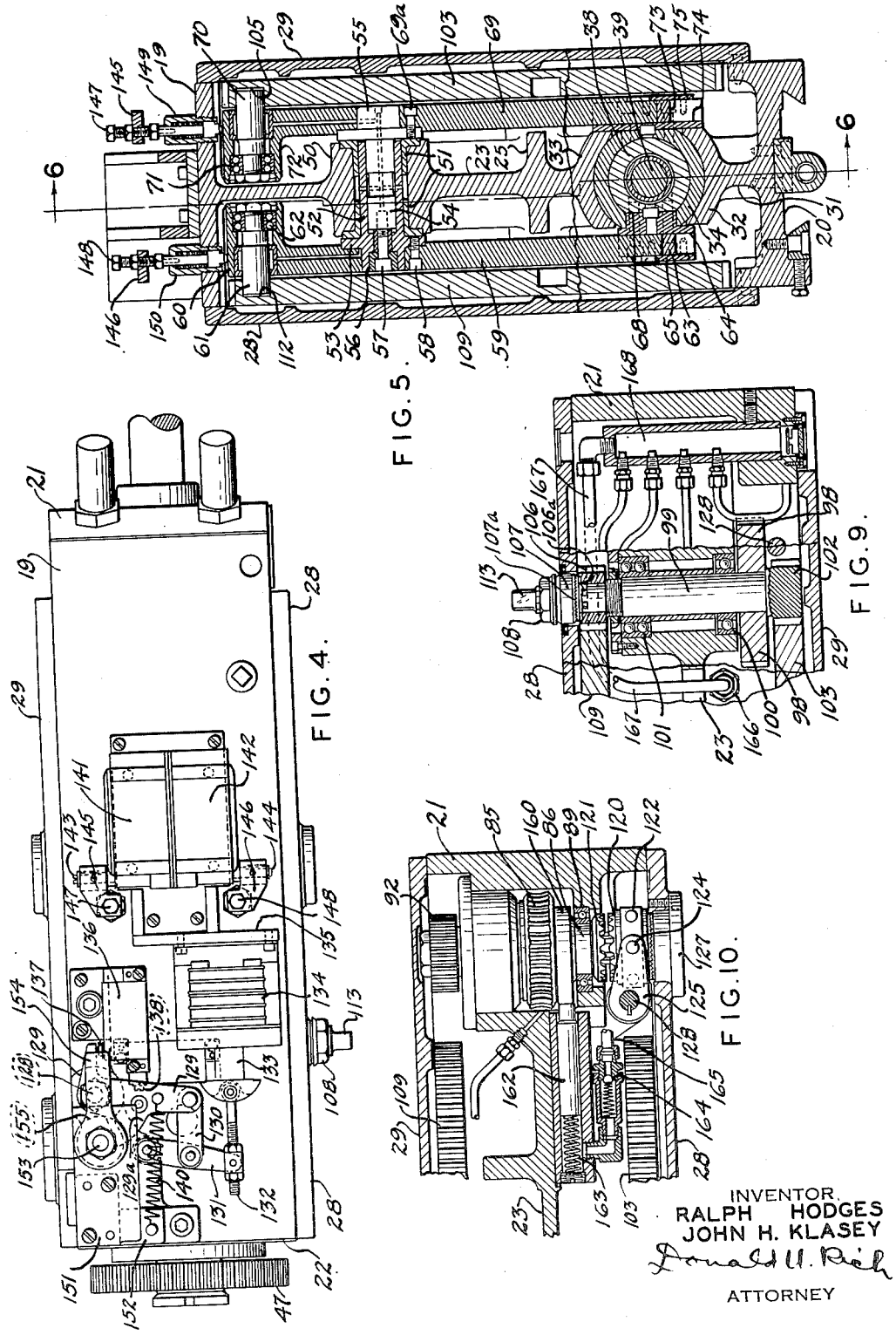

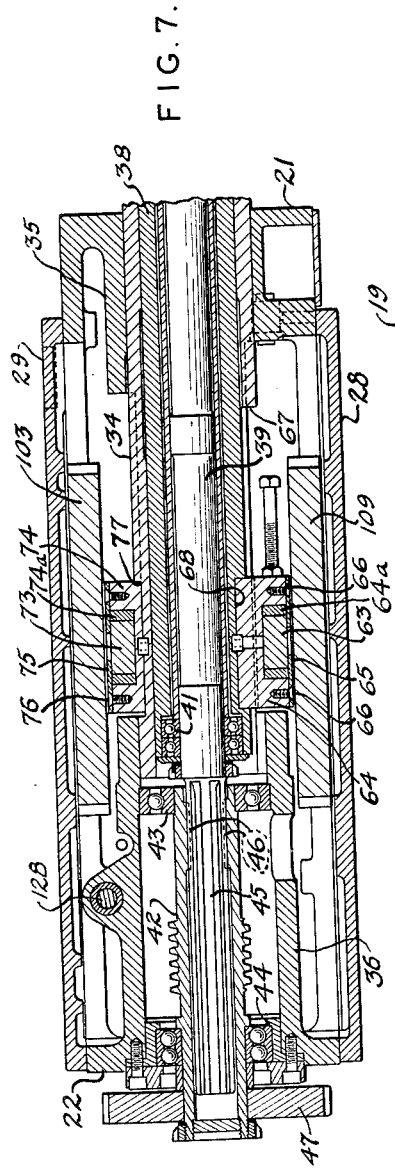
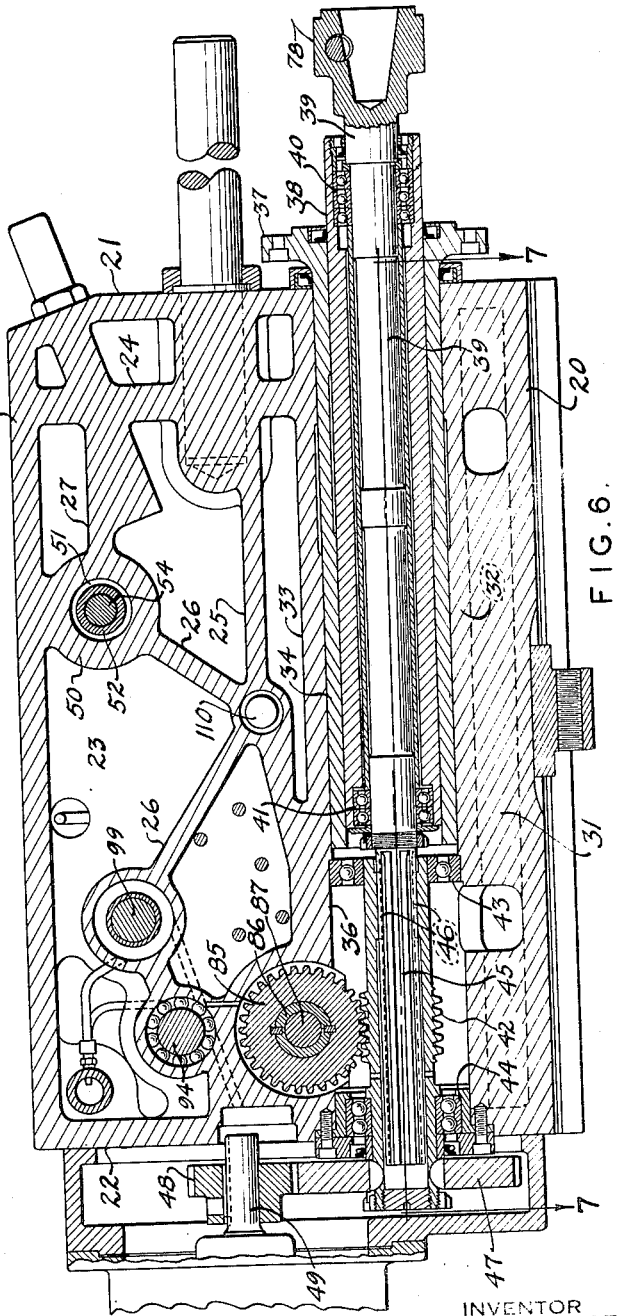

INVENTOR
RALPH HODGES
JOHN H. KLASEY
ATTORNEY

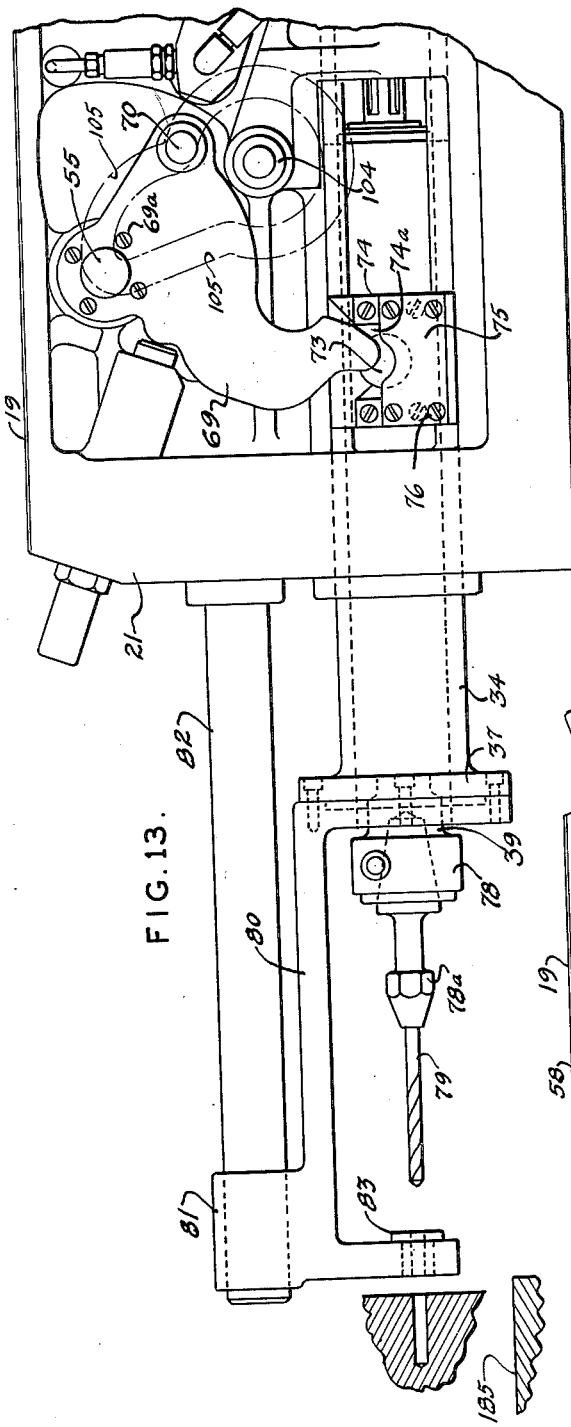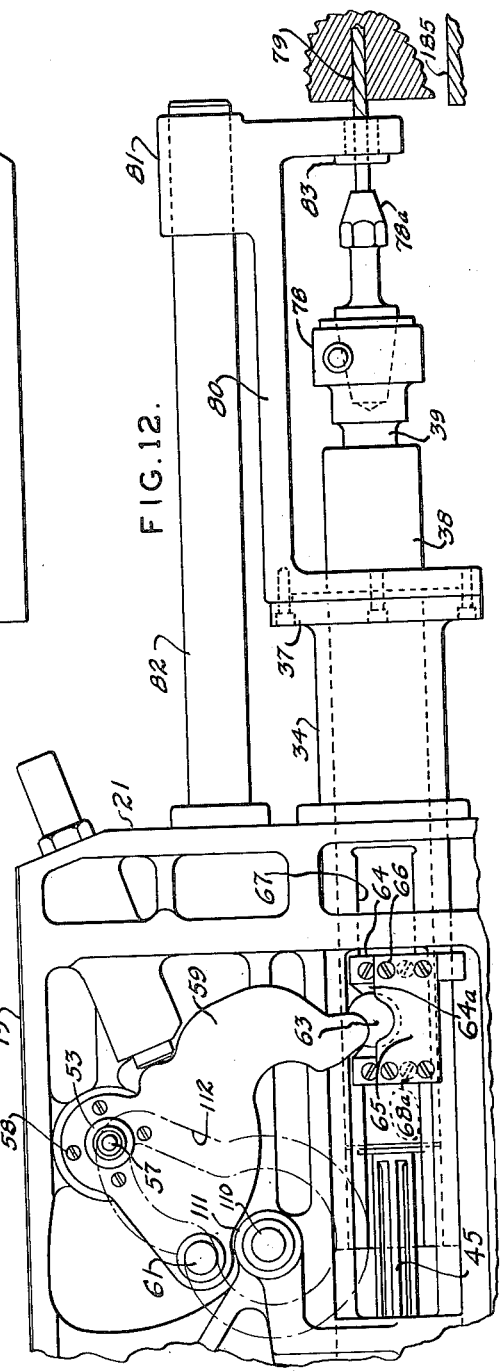

Feb. 19, 1946.   R. HODGES ET AL   2,395,121
DRILLING HEAD UNIT
Filed July 17, 1942   8 Sheets-Sheet 8

INVENTOR.
RALPH HODGES
BY JOHN H. KLASEY

George R Ericson

Patented Feb. 19, 1946

2,395,121

UNITED STATES PATENT OFFICE 2,395,121

DRILLING HEAD UNIT

Ralph Hodges, Normandy, and John H. Klasey, St. Louis, Mo., assignors to Carter Carburetor Corporation, St. Louis, Mo., a corporation of Delaware Application July 17, 1942, Serial No. 451,268

33 Claims. (Cl. 77—32)

This invention relates to the field of machine tools and more particularly to that class of machining devices embodying a rotating spindle, which is advanced and retracted with respect to the work, and a second member similarly moved toward and from the work, which member may carry a guiding bushing for a drill or the like or may cooperate with the spindle member to provide for a tool motion at an angle to the spindle axis or, in other words, a so-called actuated tool motion. The invention may be incorporated in a machine which operates individually upon the work or in a multiple unit machine of the indexing type in which the work is successively carried into operative juxtaposition with a series of machine units each of which has an operative cycle in synchronization with the indexing work support plate.

In drilling machines of the above type, as now known, the machining unit consists of a single, power driven rotating spindle which is moved toward and from the work and carries with it a member, connected to the spindle through springs in such a manner as to accommodate a drill guide bushing or an actuated tool element. At the end of the longitudinal stroke of such tool element, lateral motion is imparted thereto by wedging or camming action against the connecting springs. With this type of device, the members which cooperate in the machining operations are usually located in such positions and so connected that it is very difficult to separate one member from the other for the purpose of withdrawing or replacing a tool without substantially disassembling one of the members. This difficulty is more particularly present where the yieldingly connected member is used for carrying a drill guide bushing.

Moreover, with such devices as now known, the possibilities of actuating tool operation are limited because of the fact that after the tool has been moved laterally and then longitudinally of the spindle to make a cut, it must be returned longitudinally to the starting position before retracting the lateral motion previously imparted. Also the motion of the tool holder and the yieldingly connected member, both carried by the spindle, is necessarily closely interdependent.

Another disadvantage in known machines of the above type arises from the fact that the overload clutch interposed in the tool driving mechanism is arranged so that in case of unclutching due to overload, the driving element continues to rotate, causing an annoying and damaging chattering between the clutch elements.

It is an object of the present invention to provide a drilling machine unit of the above type in which two members are provided for cooperation in the machining operations, these members being separately operable from the power source through individual adjustable and separable drives.

It is another object to provide, in the individual drives for the cooperating machining members, means for disconnecting one of the members from the other and from the power drive to permit independent advancing and retracting of the last mentioned member with respect to the other which, in turn, facilitates manipulation of the cutting tool without the necessity of disassemblying either of the machining members.

It is another object to provide an overload clutch in the tool advancing and retracting mechanism with means for preventing chattering of the clutch in case it is disengaged due to an overload.

Still another object is to provide a generally simplified machine tool unit having a plurality of cooperating machining members, each being capable of individual adjustment in its motions without regard to the other member and thereby greatly extending the possible actuated tool operations.

These and other more detailed objects hereafter appearing are attained substantially by the mechanism illustrated in the accompanying drawings in which Fig. 1 is a side view of a machine tool unit embodying the invention, the side plate being removed and portions of certain gears being broken away for clearer illustration.

Fig. 2 is a view of the other side of the machine tool unit with the side plate removed and portions of gears broken away.

Fig. 3 is a view of the right hand end of the unit with respect to Figs. 1 and 2.

Fig. 4 is a top view of the unit, a portion of the casing being removed.

Fig. 5 is a transverse section taken substantially on the corresponding section line of Fig. 1.

Fig. 6 is a vertical, longitudinal section taken on the corresponding section line of Fig. 5, parts being omitted from the top of the unit.

Fig. 7 is a horizontal, transverse section taken on the corresponding section line of Fig. 1.

Figs. 9 and 10 are detailed sections taken on the corresponding section lines of Fig. 2.

Fig. 11 is an inside view of one of the cam gears removed from the unit.

Fig. 12 is a view of the device on the same side as Fig. 1, but showing a spindle carried drill and bushing carrier advanced toward the work.

Fig. 13 is a side view of the mechanism similar to Fig. 2, but showing the drill chuck separated from the guide bushing to facilitate withdrawal and replacement of the drill.

Figure 14:
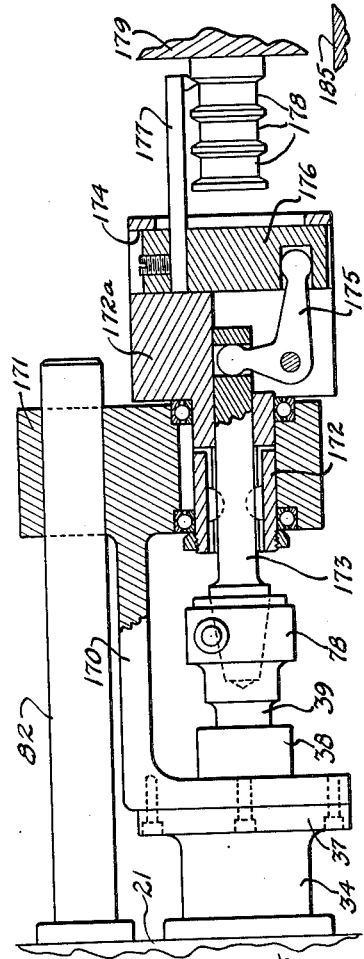
Figs. 14 and 15 are detailed sectional views illustrating different actuated tool operations which the present machining tool unit is peculiarly well adapted to perform.

The accompanying drawings illustrate a drilling unit which is adapted for use with a multi-station machine. The unit is mounted upon a base plate 18 for attachment to the base portion (not shown) of the machine and the unit mechanism is encased within a rigid frame including top plate 19, bottom plate 20, end plates 21 and 22, a longitudinal vertical web 23 and adequate bracing ribs 24, 25, 26, 27, etc. Removable side plates 28 and 29 are attached to the framing and protect the parts. A smaller sheet metal casing 30 is attached to top plate 19 and encloses certain operating parts to be described hereafter.

Figure 8:
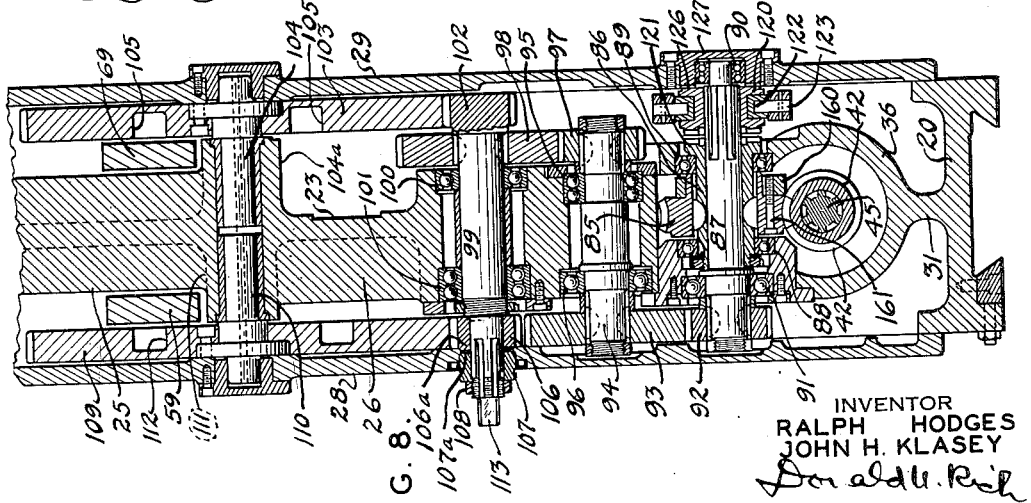
Fig. 8 is a transverse section taken on the broken line 8—8 of Fig. 1.

Supported above bottom plate 20 at the right end of the frame (Figs. 1, 6 and 7), by means of a rib 31, is a longitudinal, curved plate 32 which, together with an opposing curved plate 33 forms a bearing support for a sleeve member 34. These curved plates merge in a cylindrical sleeve guide 35 at the extreme right end of the frame. Concentric with curved plates 32 and 33, and at the other end of the frame, is a cylindrical web 36 (Figs. 1, 7 and 8). Sleeve member 34 slides longitudinally relative to the framing and at its right hand (Fig. 1) end carries an attaching plate 37.

Closely fitting and longitudinally slidable within sleeve member 34 is a supporting quill member 38 within which rotates spindle 39, in bearings 40 and 41, the quill and spindle being movable together longitudinally of the unit. A hollow worm shaft 42 is rotatably mounted in bearings 43 and 44 in line with quill member 38 and receives therein the longitudinally slotted extension 45 of the spindle. The worm has keys 46 which causes worm and spindle to rotate together, but permit longitudinal movement of the spindle relative to the worm. Rigidly mounted on the left hand extremity of the worm shaft is a gear 47 which meshes with a pinion 48 on motor shaft 49 which constitutes the power source for the unit.

Located in the upper central portion of framing web 23 (Figs. 1, 5 and 6) is an apertured boss 50 provided with bushings 51 which rotatably receive a hollow pin 52 having a flanged head portion 53 projecting leftwardly therefrom. Rotatable within hollow pin 52 is a solid pin 54 having a flanged head portion 55 projecting rightwardly from boss 50. Head portion 53 of hollow pin 52 is countersunk for receiving a shouldered bushing 56 and bolt 57 which is threaded into the inner end of solid pin 55 for maintaining the assembly while permitting rotation of pins 52 and 54 relative to each other and to the frame casting. Secured to the projecting head portion of hollow pin 52 by screws 58 and pivotally supported thereby is an irregular lever 59 having an apertured boss 60 in its upper portion and spaced from pivot pin 52 and carrying an outwardly projecting pin 61 rotatable in a bearing 62. Formed on the lower extremity of lever 59 (Figs. 1 and 7) is a disk 63 which is received in a correspondingly shaped recessed member 64a (Figs. 1, 7 and 12) which is slidably received in guide block 64 and is held therein by plate 65 secured to the guide block 64 by screws 66. Guide block 64 projects inwardly through a slot 67 in the adjacent side wall of sleeve member 37 and is received within a recess 68 in the adjacent wall of spindle guide quill 38 and secured thereto by screws 68a. This arrangement is such that when lever 59 is swung about its pivot 53, quill 38 and spindle 39 will be caused to move longitudinally within sleeve member 34.

On the other side of the frame from lever 59 (Figs. 2 and 5) and pivotally supported on the head portion 55 of pin 54 is a second irregularly shaped lever 69 eccentrically carrying in its upper portion a pin 70 rotatable in a bearing 71 in apertured boss 72. Lever 69 is secured to its supporting pin by screws 69a. At the lower extremity of this second lever (Figs. 2, 7 and 13) is a disk element 73 received within a cylindrical recess in a sliding member 74a operable in guide block 74 and held in place by a plate 75 secured to the guide block by screws 76. Guide block 74 is received within a closely fitting recess 77 in the adjacent side wall of sleeve member 34. The connection of lever 69 with the sleeve member is such that pivoting of the lever about its supporting pin 54 causes longitudinal movement of the sleeve member within its curved guiding plates 32, 33 and 35.

On the right hand end of spindle 39 (Figs. 1 and 6) there is provided a spindle nose 78 which may mount, for instance, a drill adaptor chuck 78a and drill 79, as in Figs. 12 and 13. Plate 37 may mount a bracket 80 carrying a guide boss 81 slidable on a guide rod or bar 82 projecting from the framing and also a bushing 83 for receiving and guiding drill 79.

The mechanisms for actuating levers 59 and 69 to advance and retract the quill and tool holder member and sleeve member 34 are the following:

A worm gear 85 (Figs. 6, 8 and 10) meshes with worm 42 and is splined to a sleeve 86 rotatable on a shaft 87 and supported in bearings 88 and 89. Shaft 87 is carried in bearings 90 and 91. A pinion 92 is keyed to the left hand end of shaft 87 (Figs. 1 and 8) and meshes with an idler gear 93 keyed on shaft 94 carried in bearings 95 and 96. Keyed to the opposite end of shaft 94 is a pinion 97 which meshes with a gear 98 keyed to a shaft 99 supported in bearings 100 and 101. Shaft 99 projects rightwardly beyond gear 98 (Fig. 8) and is keyed to or otherwise rigidly mounts a pinion 102 which meshes with a larger gear 103 supported on a stub shaft 104. Shaft 104 is carried in a bearing boss 104a projecting from frame web 23. Gear 103 has a cam recess 105 on the inner surface thereof, which recess receives cam follower pin 70 projecting from the upper portion of lever 69 which, in turn, drives sleeve member 34.

On the end of shaft 99 opposite pinion 102 there is loosely mounted a second pinion 106 (see Figs. 8 and 9) which has a roughed outer face 106a for clutching engagement with the roughened face 107a of a collar member 107 splined to shaft 99 for rotation therewith but capable of longitudinal movement therealong. Collar member 107 is normally held by a nut 108 in clutching engagement with pinion 106 so that the motion of shaft 99 is transmitted thereto. Pinion 106 meshes with a large gear 109 mounted on a stub shaft 110. Shaft 110 is mounted in an apertured boss 111 opposite boss 104a. Gear 109 has a cam recess 112 which receives follower pin 61 in the upper portion of pivoted lever 59 which actuates quill 38 and tool carrying spindle 39. The end 113 of shaft 99 is squared so that when clutching collar 107 is withdrawn from pinion 106, a wrench may be applied for rotating shaft 99 and thus longitudinally actuating pinion 102, cam gear 103, lever 69 and sleeve member 34 independently of quill 38 and the spindle. In Figs. 1 and 2 cam gears 109 and 103 are mostly broken away, the inside of gear 109 being shown in Fig. 11. The configuration of their respective cam recesses 112 and 105 are shown in broken lines on Figs. 1 and 2 so as to indicate the interaction of the cam recesses and cam follower pins 61 and 70. These caming recesses are shaped to provide for the desired longitudinal motion of the quill and tool holder member and the outer sleeve member and these motions may be individually adjusted by properly shaping the cam recesses. Bumpers 114 and 115 resist the advancing movements of actuating levers 59 and 69 and urge the same toward their rest positions as in Figs. 1 and 2.

The advancing and retracting mechanisms are driven from motor shaft 49 through an overload clutch arrangement best shown in Figs. 8 and 10. The end of shaft 87 opposite pinion 92 is longitudinally slotted and receives thereon a toothed clutching plate 120, for rotation therewith but capable of longitudinal movement therealong. The adjacent end of sleeve 86 is enlarged, as at 121, and is provided with tapered clutching teeth to cooperate with opposing teeth on plate 120. A collar 122 is loosely received on clutch plate 120 and is apertured at 123 for receiving pins 124 on clutch yoke 125. The outer face of clutch plate 120 is roughed, as at 126 (Fig. 2) for braking engagement with the roughened inner face of a fixed plug 127.

Yoke 125 is secured to a vertical shaft 128 (Figs. 2, 4 and 10) at the upper end of which is rigidly fastened a bell crank 129. One arm of this bell crank is connected through multiplying leverage 130 and 131 to a stem 132 on the core 133 of a solenoid 134 mounted on a bracket 135 on top plate 19. When solenoid 134 is energized, as will be described more in detail in connection with the wiring diagram, clutch parts 120 and 121 are caused to engage so that power is transmitted from gear 85 and worm 42 to the tool advancing and retracting mechanisms.

Also mounted on the top plate of the framing is a switch housing 136 from which projects the clutch safety limit switch operator 137 in position to be actuated by one arm of bell crank 129, and the clutch overload cut-off switch operator 138 in position to be actuated by a depending pin 139 on another arm of bell crank 129. Bell crank 129 is constantly urged clockwise by a coiled tension spring 140 so that when solenoid 134 is deenergized, switch operator pin 137 is moved into the switch housing to close the safety switch, and switch operator pin 138 is projected outwardly of the housing for opening the cut-out switch.

Additional switch devices in housings 141 and 142 have, respectively, switch operating shafts 143 and 144 with cranks 145 and 146 thereon carrying adjusting tappets 147 and 148 which extend below guides 149 and 150 in top plate 19 of the framing, in position to be engaged and urged upwardly by irregular levers 59 and 69 when the tool carrying members operated thereby are in their retracted positions, as shown in Figs. 1 and 2.

A bracket 151 (Figs. 2 and 4) is bolted to a block 152 projecting above the framing top plate and loosely receives a vertical shaft 153. A clutch release handle 154 is secured to the upper extremity of this shaft and a cam 155 is rigid with the shaft below bracket 151 and aligned with a free arm 129a of bell crank 129. Manual rotation of handle 154 and cam 155 causes a high point on the cam to engage and rotate the bell crank shaft 128, and clutch yoke 125 just sufficiently to move clutch plate 120 to a neutral position between brake plug 127 and clutch sleeve face 121. If, then, clutching collar 107 (Fig. 9) is withdrawn from loose pinion 106, squared shaft 113 can be rotated by a wrench to produce longitudinal reciprocation of sleeve member 34 independently of worm gear 85 and also spindle 39, to the position shown in Fig. 13, which permits the removal and installation of the drill or other tool without disassembly of either of the reciprocating members or removal of the work from its support, indicated at 185. As usual, the work support is in fixed relation with the machining head unit and mounts a suitable fixture (not shown) for bracing the work. When the overload clutch and loose pinion 105 are engaged and the driving motor energized, sleeve member 34 and the quill and spindle member are jointly advanced forward, as in Fig. 12, and retracted to the rest positions thereof, as in Figs. 1 and 2, in operative cycles according to the configuration of cam grooves 105 and 112.

An eccentric 160 (Figs. 8, 9 and 10) is rigidly secured to worm gear 85 by screws 161 and engages an oil pump piston 162 constantly urged thereagainst by a coiled spring 163. This pump is arranged to draw oil past intake check 164 and through pipe 165 from an oil sump at the bottom of the framing and to discharge the same past an outlet check in casing 166 and a pipe 167 to manifold 168 from whence the oil is directed to the bearings.

Secured in a bracket 210 depending from guide block 64 (Fig. 1) is a screw 211 for engaging a reach pin 212 at the most advanced position of the spindle to reverse a switch 213 and thereby reverse the unit motor. This feature is used only where the unit is used for threading or similar operations to permit retraction of the tool. For other operations the screw and also switch 213 are omitted, as in Figs. 12 and 13.

Figure 15:
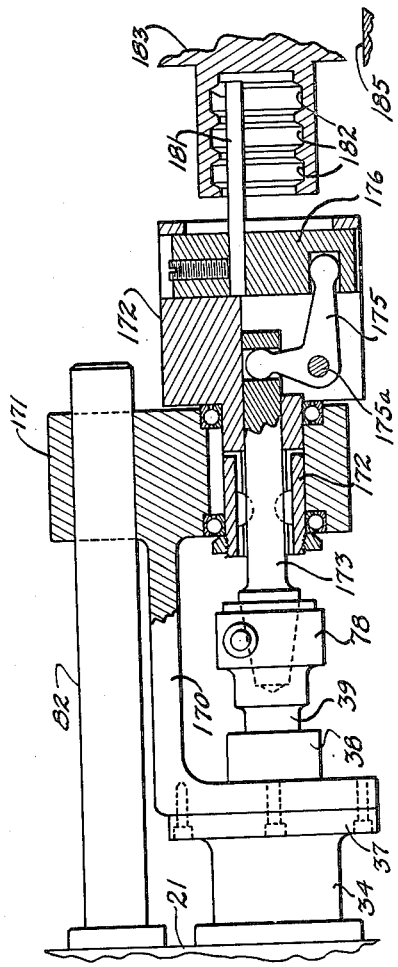

Figs. 14 and 15 illustrate the application of the unit to actuated tool operations which cannot be performed by the usual type of drilling unit in which any lateral motion must be imparted to the tool by wedging action against springs. In Fig. 14, a bracket 170 is mounted on outer sleeve member 34 and carries a supporting head 171 which rotatably receives a guiding cylinder 172 keyed to a longitudinal bar 173 secured in spindle nose 78. Cylinder 172 has an enlarged extension 172a provided with a transverse slot 174 at its outer end. A bell crank 175 is pivoted to the extension on pin 175a and has one arm received in a notch in the adjacent end of bar 173 and the other arm received in a notch in a plate 176 which carries a cutting tool 177, and is vertically guided in slot 174. Thus, extension 172a forms a guide block receiving tool carrying plate 176. A tool is being used to make a cut in each of a plurality of grooves 178 in the work 179 during a single longitudinal cycle of the sleeve and spindle members. By properly shaping cam grooves 106 and 112 in large gears 103 and 109, tool 177 is caused to successively enter each groove 178, make a longitudinal cut therealong, pass over the intervening ridges, and then return over the tops of the ridges. With the known types of drilling units adapted for actuated tool operations, only one of the grooves 178 can be cut by the unit, the cutting of the other grooves requiring other units.

In Fig. 15, a tool set up similar to that in Fig. 14 carries a cutter 181 for making a plurality of internal grooves 182 in the work 183. In the operations shown in both Figs. 14 and 15, the cutting tool can be withdrawn laterally from the right hand end of the work rather than being returned to the starting position before such withdrawal, as has been necessary heretofore.

Figure 17:
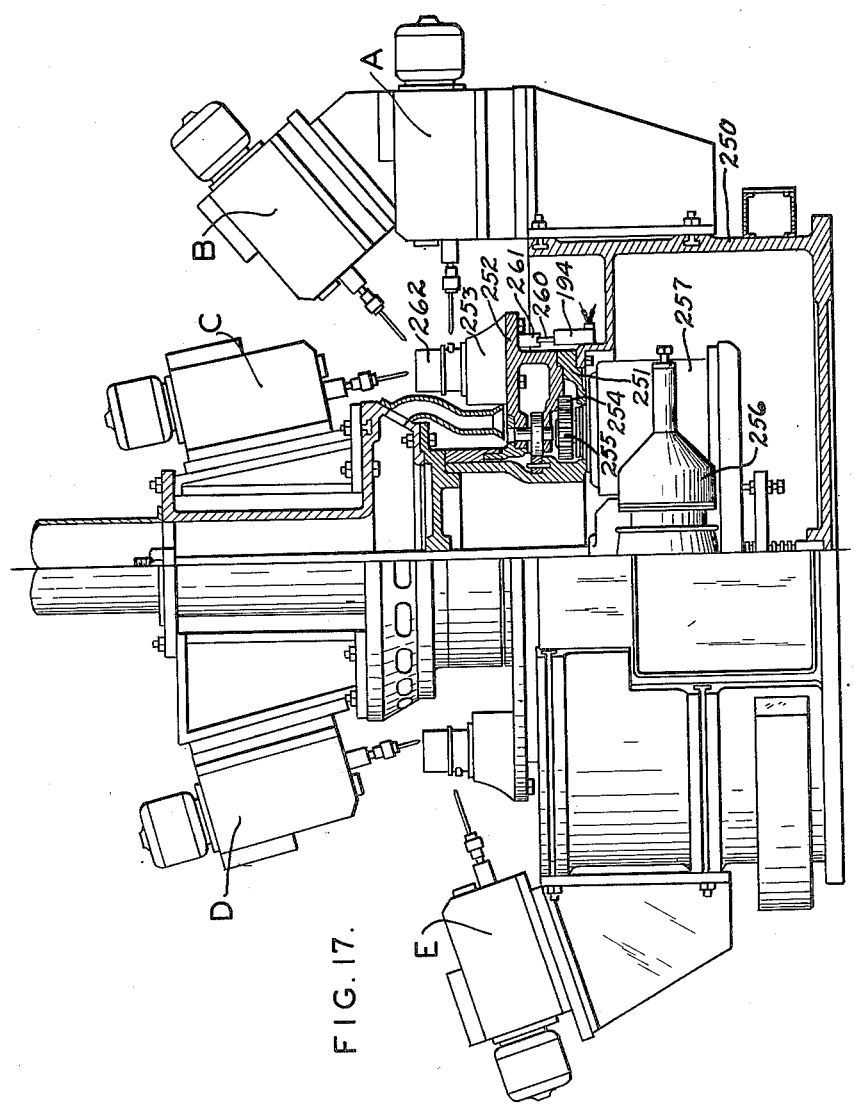
Fig. 17 is a side view, partly sectioned, illustrating a multiple station indexing type drilling machine having a number of the novel drilling head units applied thereto.

Fig. 17 illustrates a multiple station drilling machine of the type more fully disclosed and claimed in a copending application, Serial No. 351,362, filed August 4, 1940, Patent No. 2,358,389, issued September 19, 1944, in the names of William M. Ewart and John H. Klasey. This machine has a substantial, cylindrical base 250 having a central opening in its top wall to which is secured a bearing ring 251 upon which rotates the work table 252. A series of work mounts 253 are spaced equidistant around the table. On the under surface of the table there is provided a ring gear 254 which is propelled by a pinion 255 from motor 256 and indexing mechanism inclosed within a box 257. A switch 194 attached to the base has an actuating lever 260 which is tripped by a lug 261 depending from the work table as the latter is locked in its indexing position.

A series of drilling heads units A, B, C, D, and E are mounted at various points on the base structure for operating upon the work 262 affixed to the stand 253.

Figure 16:
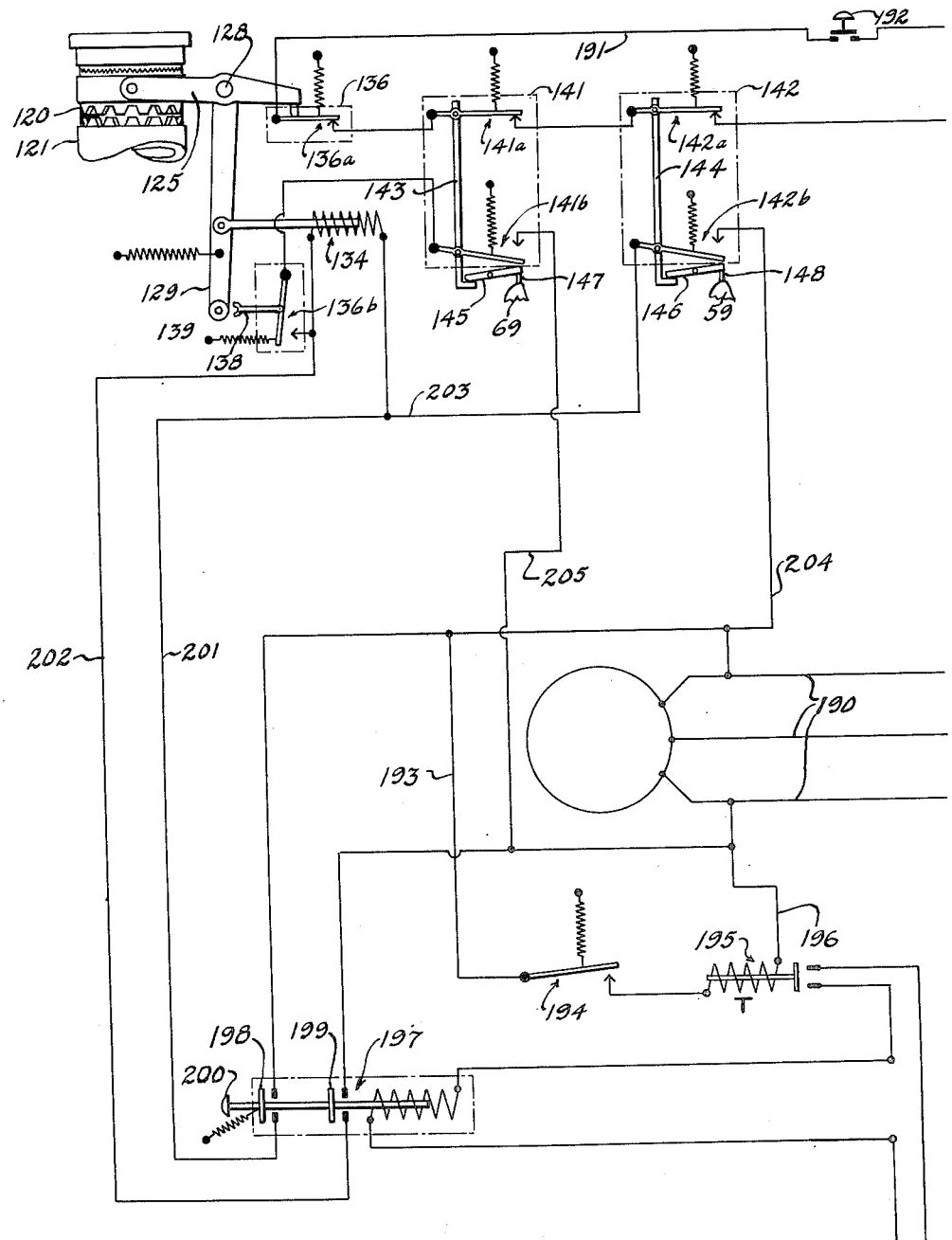
Fig. 16 is a partial wiring diagram illustrating simplified wiring for the tool unit.

The diagram in Fig. 16 illustrates the wiring arrangement of the machine head unit when used in a multi-station drilling machine having an indexing work support table indicated at 185. Corresponding parts appearing in the previous figures are given similar designating numbers for reference. The power lines for the unit motor are indicated at 190, three wires being provided for three phase current. The power circuit for the indexing table is shown at 191 and includes a manual indexing button 192 to be pushed by the operator to initiate indexing movement of the table and the correlated cycles of the machine head units. Circuit 191 breaks through the normally open clutch safety switch 136a in housing 136 and the normally open contacts 141a of spindle return switch 141 and 142a of sleeve return switch 142, the latter being two contact switches.

For operating the over load clutch to produce the advancing and retracting cycles of the spindle and sleeve members, a lead 193 from one of the power lines breaks through a switch 194 which is closed in response to locking of the indexing table in a working position, (see Fig. 17) and the coil of a time delay relay 195 and thence by wire 196 to the other power line. Relay 195 is of such character as to automatically open after being closed a short time. This relay controls the coil of a magnetic switch 197, one such magnetic switch similarly controlled being provided for each machining head unit. The movable contacts 198 and 199 of switch 197 may be manually operated by means of a button 200 for initiating a working cycle of one unit only. Solenoid 134, when energized, rotates bell crank 129, shaft 128, and yoke 125 counterclockwise to engage clutch elements 120 and 121 and is initially energized by a circuit including wires 201 and 202 each breaking through one of the contacts 198 and 199 of magnetic switch 197. Engagement of the clutch causes rotation of the train of gears which starts the longitudinal cycles of spindle 39 and sleeve member 34.

Counterclockwise rotation of bell crank 129 for engaging clutch 120, 121 also permits opening of switch 136a in the indexing table circuit and, at the same time, closes switch 136b by engagement of actuating plunger 138 by pin 139 carried by the bell crank. As cam follower arms 69 and 59 start their cycles, switch actuator pins 147 and 148 are released, permitting reversing of switch contacts 141a and 142a, opening the indexing table circuit and closing contacts 141b and 142b. A second energizing circuit for clutch holding solenoid 134 is provided by a lead 203 breaking through switch 142b, a lead 204 to the power line, and a lead 205 breaking through clutch overload switch 136b and spindle return switch 141b to the other power line.

Thus, if the indexing table is in a working position and both sleeve member 34 and quill 39 are in their rest positions (Figs. 1 and 2), switches 194, 136a, 141a, and 142a will be closed and the operator can initiate the operating cycle by merely pressing indexing button 192. Time relay 195 and unit control magnetic switch 197 are then closed so as to cause engagement of the overload clutch and start longitudinal reciprocation of the sleeve and spindle members. Initial rotation of arms 59 and 69 is accompanied by closing of switches 136b, 141b and 142b and completion of the second circuit 203, 205 for energizing the clutch magnet 134. After a short time interval, the relay 195 automatically opens. Thereafter, in case an overload should cause separation of clutch elements 120 and 121, switch 136b, which is a micro-switch, will be immediately opened so as to deenergize clutch holding solenoid 134 and stop the reciprocation of the spindle and sleeve members. This eliminates the chattering of the clutch members, which would otherwise occur if holding force were continuously applied to the clutch through solenoid 134 until the operator has stopped the machinery. Damage to the clutch and other parts is thus avoided as is the very annoying chattering noise.

The above wiring arrangement provides for fully automatic operation of the machinery only dependent upon initiation thereof by the operator and the proper positioning of the working parts, and also provides adequate safety features in that motions of the indexing table are prevented until the sleeve and spindle members have returned to their rest positions and the overload clutch is disengaged. Movement of the spindle and sleeve members toward the work is prevented until the work table is locked in a working position. The invention adapts a drilling machine to the performance of more widely varying machining operations than heretofore has been possible with this type of machine and, furthermore, manipulation of the machine and particularly the removal and installation of cutting tools, is greatly simplified.

The invention may be modified in various respects as will ocur to those skilled in the art and the exclusive use of all such modifications as come within the scope of the appended claims is contemplated.

We claim:

1. In a machine tool, a work support, a spindle member, means to rotate said member and to move the same towards and from the work, a second member movable towards and from the work, connecting means normally effecting correlated movement of said members towards and from the work for cooperation in machining operations, and means to render said connecting means inoperative and to move said members independently toward and from their working positions to facilitate application of a tool to and withdrawal thereof from said spindle member without disassembly of either of said members or removal of the work.

2. In a machine tool, a work support, a power source, a spindle member carrying a tool holder, means connecting said member to said power source for rotation of the former, a second member for cooperating with said spindle member in machining operations, mechanisms separately connecting each of said members to said power source for advancing and retracting said members toward and from the work, means operatively connecting said mechanisms for causing correlated movements of said members in machining operations, and means for rendering said connecting means inoperative to permit independent advancing and retracting movement of one of said members relative to the other and to facilitate manipulation of a tool in said holder.

3. In a machine tool, a work support, a power source, a spindle member carrying a tool holder, means connecting said member to said power source for rotation of the former, a second member for cooperating with said spindle member in machining operations, mechanisms separately connecting each of said members to said power source for advancing and retracting said members toward and from the work, means operatively connecting said mechanisms for causing correlated operation of said members in machining operations upon the work, and means to disconnect one of said members from said connecting mechanisms and to cause independent advancing and retracting movement thereof to facilitate manipulation of a tool in said holder.

4. In a machine tool, a work support, a spindle member carrying a tool holder, means to rotate said spindle member and to move the same towards and from the work, a second member movable in guided relation towards and from the work, means including a gear train normally connecting said members for correlated movements towards and from the work for cooperating in machining operations, said train including a pair of gears one for each member and one of said gears being readily removable from its operative position, and means to actuate said spindle member toward and from the work independently of said second member, when said gear is so removed, to facilitate application of a tool to and removal of the same from said holder.

5. In a machine tool, a work support, a rotatable spindle member carrying a tool holder, a second, guided member, and means to move said members jointly in juxtaposed relationship to and from the work for cooperation in machining operations, said means including a pair of gear trains each having a gear on a common supporting shaft, one of said gears being axially slidable on said shaft to vitiate the operative connection between said members, said supporting shaft having a projecting, non-circular end for reception of a wrench to permit independent actuation of one of said gear trains and separation of said members longitudinally to facilitate insertion of a tool in said holder or removal of the same therefrom without otherwise disassemblying the machine or removing the work.

6. In a machine tool, a work support, a spindle member carrying a tool holder, a second member movable in juxtaposition with and in the same direction as said spindle member, means to rotate said spindle member and to advance and retract said members jointly with respect to the work for cooperating in machining operations, said means including a clutch and a pair of gear trains, each gear train having a gear on a common supporting shaft, and manual means to move said clutch to neutral position and to move one of said last mentioned gears to a non-meshing position so as to permit independent advancing and retracting of one of said cooperating members and facilitate manipulation of a tool in said holder.

7. In a machine tool, a work support, a spindle member carrying a tool holder, a second member movable in juxtaposition with and in the same direction as said spindle member for cooperating with said spindle member in machining operations, a power shaft, a pair of pivoted levers each engaging one of said members for enforcing advancing and retracting movements thereof with respect to the work, a cam device associated with each of said levers and said power shaft for actuating said levers as determined by the cam shape, and a gear train operatively connecting each of said cam devices to said power shaft, one of said gear trains having a gear readily removable from and returnable to its meshing position to permit independent advancing and retracting movements of the corresponding one of said machining members to facilitate manipulation of a tool in said holder.

8. In a drill unit including a frame formed with a guideway, a longitudinally movable sleeve mounted in said guideway, a longitudinally movable and rotatable spindle mounted in said sleeve, a source of power, and means for utilizing said source of power for longitudinally moving both said spindle and said sleeve, said spindle being movable by said means independently of the movement of said sleeve.

9. In a drill unit including a frame formed with a guideway, a longitudinally movable sleeve mounted in said guideway, a longitudinally movable and rotatable spindle mounted in said sleeve, a source of power, means for utilizing said source of power for longitudinally moving said rotatable drill spindle and said sleeve, the longitudinal movement of said spindle being independent of that of said sleeve, and means for disengaging said source of power from said sleeve to permit manual operation of same.

10. A combined drilling and cutting unit including a frame, a sliding member mounted in said frame, a second member mounted in said frame for rotatable and longitudinal movement independently of the movement of said sliding member, a tool holder carried by one end portion of one of said slidable members and shiftable at an angle intersecting the axis of the other member, means for shifting said tool holder by relative movement of said members, and power means operating on independent cycles for longitudinally actuating said members.

11. A combined drilling and cutting unit including a frame, a slidable tubular member mounted in said frame, a drill member including a rotating spindle mounted in said slidable tubular member and shiftable longitudinally with respect thereto, a tool holder carried at the end portion of said tubular member, said tool holder being movable laterally with respect to the axis of said drill spindle, pivoted means shiftable by sliding movement of said drill spindle for moving said tool holder laterally, and means for actuating said sliding sleeve and drill spindle independently with relation to each other.

12. A combined drilling and cutting unit including a frame, a slidable tubular member mounted in said frame, a drill member including a rotating spindle mounted in said slidable tubular member and shiftable longitudinally with respect thereto, a tool holder carried at the end portion of said tubular member, said tool holder being movable laterally with respect to the axis of said drill spindle, pivoted means shiftable by sliding movement of said drill spindle for moving said tool holder laterally, and means for actuating the drill spindle independent of the movement of the sliding sleeve.

13. A combined drilling and cutting unit including a frame, a slidable tubular member mounted in said frame, a drill member including a rotating spindle mounted in said slidable tubular member and shiftable longitudinally with respect thereto, a tool holder carried at the end portion of said tubular member, said tool holder being movable laterally with respect to the axis of said drill spindle, means shiftable by sliding movement of the drill spindle with relation to the tubular member for moving said tool holder laterally, and means for actuating the drill spindle independent of the movement of the sliding sleeve.

14. A combined drilling and cutting unit including a frame, a slidable tubular member mounted in said frame, a drill member including a rotatable spindle mounted in said slidable tubular member and shiftable longitudinally with respect thereto, a removable element carried by said drill spindle adjacent the outer end of said tubular member, a tool guiding member carried at the end portion of said tubular member and movable therewith, said tool guiding member being in guided contact with said removable member, a tool holder carried by said tool guiding member and shiftable in a plane intersecting the axis of said drill spindle, means connecting the removable member and the tool holding member to shift the latter upon sliding movement of the former, and power means for actuating the parts.

15. A combined drilling and cutting unit including a frame, a slidable tubular member mounted in said frame, a drill member including a rotatable spindle mounted in said slidable tubular member and shiftable longitudinally with respect thereto, a removable element carried by said drill spindle adjacent the outer end of said tubular member, a tool guiding member carried at the end portion of said tubular member and movable therewith, said tool guiding member being in guided contact with said removable member, a tool holder carried by said tool guiding member and shiftable in a plane intersecting the axis of said drill spindle, and a member pivoted to the tool guiding member and engaging said removable element and said tool holder to shift the latter upon movement of said drill spindle with respect to said tubular member.

16. In a drilling machine, a frame, a rotatable and slidable spindle mounted in said frame, a member carried by said drill spindle, a sliding member mounted in said frame, means for sliding said member with relation to the sliding movement of said spindle, a head carried by said slidable member, a rotatable guide block carried by said head and engaging the spindle carried member for guided movement with respect thereto, a tool holder in said guide block, said tool holder being shiftable in said guide block in a plane intersecting the axis of said spindle, and means connected to said spindle for shifting said tool holder upon relative sliding movement between said spindle and sliding member, said last-named means forming a driving connection between said spindle and said guide block for rotating the latter with said spindle.

17. In a drilling machine including a slidable and rotatable spindle, a longitudinal bar carried by said spindle, a supporting head formed with an opening through which said bar extends, a guide block splined on said bar, a bearing interposed between said guide block and the wall of said opening, means for causing independent longitudinal movements of said bar and said guide block, a tool carrier slidable in said guide block in a plane intersecting the axis of said spindle, and means connecting said guide bar and said tool carrier to cause said tool carrier to shift upon longitudinal movement of said guide block with respect to said bar.

18. In a drilling machine including a slidable and rotatable spindle, a longitudinal bar carried by said spindle, a supporting head formed with an opening through which said bar extends, a guide block splined on said bar, a bearing interposed between said guide block and the wall of said opening, means for causing independent longitudinal movements of said bar and said guide block, a tool carrier slidable in said guide block in a plane intersecting the axis of said spindle, and means connecting said guide bar and said tool carrier to cause said tool carrier to shift upon movement of said guide block longitudinally with respect to said bar, said last-named means forming a driving connection between said tool carrier and said spindle to rotate said carrier with said spindle.

19. In a drilling machine including a slidable and rotatable spindle, a longitudinally movable and rotatable guide block formed with a guideway, a tool holder movable in said guideway in a plane intersecting the axis of the spindle, means to produce independent longitudinal reciprocation of said spindle and said guide block, and means for rotating said guide block by rotation of said spindle and for moving said tool holder in said guideway by sliding movement of said spindle relative to said guide block.

20. In a drilling machine including a slidable and rotatable spindle, a longitudinally movable and rotatable guide block formed with a guideway, a tool holder movable in said guideway in a plane intersecting the axis of the spindle, means to produce independent longitudinal reciprocations of said spindle and said guide block, and means for moving said tool holder in said guideway by sliding movement of said spindle relative to said guide block and for transmitting the rotatable movement of said spindle to said guide block.

21. In a drilling machine including a slidable and rotatable spindle, a longitudinally movable and rotatable guide block carried by said spindle and formed with a guideway, said guideway extending in a plane intersecting the axis of said spindle, a tool holder in said guideway, means to produce independent longitudinal reciprocations of said spindle and said guide block, and a common element for shifting said tool in its guideway upon sliding movement of said spindle with relation to said guide block and simultaneously rotating said guide block with said spindle.

22. In a drilling machine including a slidable and rotatable spindle, a longitudinally movable and rotatable guide block carried by said spindle, means independent of the spindle for longitudinally moving said guide block, said guide block being formed with a guideway, said guideway extending in a plane intersecting the axis of said spindle, a tool holder in said guideway, and a common element for shifting said tool in its guideway upon sliding movement of said spindle with relation to said guide block and simultaneously rotating said guide block with said spindle.

23. In a drilling machine including a slidable and rotatable spindle, a longitudinally movable and rotatable guide block movable with said spindle, independently controlled means for longitudinally moving said guide block and said spindle, said guide block being formed with a guideway extending in a plane intersecting the axis of said spindle, a tool holder in said guideway, and a common element for shifting said tool in its guideway upon sliding movement of said spindle with relation to said guide block and simultaneously rotating said guide block with said spindle.

24. In a device of the character described, a slidable and rotatable spindle, a member movable with said spindle, a rotatable and longitudinally movable guide block mounted with its axis parallel to the axis of said spindle, means to produce independent longitudinal reciprocations of said spindle and said guide block, a tool holder carried by said guide block and movable in a plane intersecting the axis of said spindle, means operated by the rotation of said spindle for rotating said guide block, and means operated by the sliding movement of said spindle for moving said tool holder.

25. In a device of the character described, a rotatable and slidable spindle, a member carried by and movable with said spindle, a rotatable and longitudinally movable guide block mounted with its axis substantially parallel to the axis of said spindle, means to produce independent longitudinal reciprocations of said spindle and said guide block, a tool holder carried in said guide block and shiftable in a plane intersecting the axis of said spindle, and a connecting element between said spindle carried member and said tool holder for rotating the guide block and shifting said tool holder.

26. In a device of the character described, a rotatable and slidable spindle, a member carried by said spindle and movable therewith, a rotatable guide block having a guideway therein, means to produce independent longitudinal reciprocations of said spindle and said guide block, a tool holder mounted in said guideway and movable at an angle to the axis of said spindle, and means connecting said spindle carried member and said tool holder for driving said guide block, and means for shifting said tool holder upon sliding movement of said spindle.

27. In a machine tool, including a slidable and rotatable spindle, a sliding member arranged with its axis substantially parallel to the axis of said spindle, a longitudinal bar driven by said spindle, a supporting bracket carried by said sliding member, a guide block rotatably supported by said supporting bracket, said guide block being provided with a guideway lying in a plane intersecting the axis of said spindle, a tool holder in said guideway, means for rotating said guide block by rotation of said spindle, means for sliding said tool holder in its guideway upon sliding movement of said spindle relative to said guide block, a source of power, means for rotating said spindle from said source of power, means for transmitting independent sliding movements to said spindle and said slidable member from said source of power, and means for disengaging said source of power from said sliding member to permit said spindle to travel axially independent of said sliding member.

28. In a machine tool, including a slidable and rotatable spindle, a sliding member arranged with its axis substantially parallel to the axis of said spindle, a bar driven by said spindle, a supporting bracket carried by said sliding member, a guide block rotatably supported by said bracket and slidably mounted on said bar, said guide block being provided with a guideway lying in a plane intersecting the axis of said spindle, a tool holder in said guideway, means for rotating said guide block by rotation of said spindle, means for sliding said tool holder in its guideway upon sliding movement of said spindle relative to said guide block, a source of power, means for rotating said spindle from said source of power, means for transmitting independent sliding movements to said spindle and said slidable member from said source of power, said means including a shaft driven from said source of power, removable cams fixed to said shaft, actuating levers operably associated with said cams, connections between said levers and said spindle and sliding member for producing independent longitudinal movements thereof, and means for disengaging one of said cams from said shaft to permit the sliding movement of said spindle independent of the slidable member.

29. In a machine tool, including a slidable and rotatable spindle, a sliding member arranged with its axis substantially parallel to the axis of said spindle, a bar driven by said spindle, a supporting bracket carried by said sliding member, a guide block rotatably supported by said bracket and slidably mounted on said bar, said guide block being provided with a guideway lying in a plane intersecting the axis of said spindle, a tool holder in said guideway, means for rotating said guide block by rotation of said spindle, means for sliding said tool holder in its guideway upon sliding movement of said spindle relative to said guide block, a source of power, means for rotating said spindle from said source of power, means for transmitting independent sliding movements to said spindle and said slidable member from said source of power, said means including a shaft driven from said source of power, removable cams fixed to said shaft, actuating levers operably associated with said cams, and connections between said levers and said spindle and sliding member, resilient spring means resisting movement of said actuating levers to urge the same towards rest position, and means for disengaging one of said cams from said shaft to permit the sliding movement of said spindle independent of the slidable member.

30. A drilling unit including a rotating drill spindle, means to rotate said spindle, an axially movable spindle support, an axially movable sleeve enclosing the spindle support, means for moving said spindle support in said sleeve, a guide block rotatably supported by the sleeve, a tool carrier supported by said guide block and shiftable in a plane intersecting the axis of said drill spindle, means for rotating said guide block by the rotation of said spindle, means for shifting said tool carrier in said guide block by the axial movement of said spindle carrier, and means for longitudinally shifting said guide block by axial movement of said sliding sleeve.

31. A drilling unit including a rotating drill spindle, means to rotate said spindle, an axially movable spindle support, an axially movable sleeve enclosing the spindle support, means for moving said spindle support in said sleeve, a guide block rotatably supported by the sleeve, a tool carrier supported by said guide block and shiftable in a plane intersecting the axis of said drill spindle, means for rotating said guide block by the rotation of said spindle, means for shifting said tool carrier in said guide block by the axial movement of said spindle carrier, means for longitudinally shifting said guide block by axial movement of said sliding sleeve, a source of power, means for rotating said spindle from said source of power, means for axially moving said spindle support and sleeve from said source of power, and means for axially moving said spindle support independent of the movement of said sleeve.

32. A drilling unit including a rotating drill spindle, means to rotate said spindle, an axially movable spindle support, an axially movable sleeve enclosing the spindle support, means for moving said spindle support in said sleeve, a guide block rotatably supported by the sleeve, a tool carrier supported by said guide block and shiftable in a plane intersecting the axis of said drill spindle, means for rotating said guide block by the rotation of said spindle, means for shifting said tool carrier in said guide block by the axial movement of said spindle carrier, means for longitudinally shifting said guide block by axial movement of said sliding sleeve, a source of power, means for rotating said spindle from said source of power, means for axially moving said spindle support and sleeve from said source of power, means for axially moving said spindle support independent of the movement of said sleeve, and means for regulating said source of power by the predetermined position of said sleeve.

33. A drilling unit including a rotating drill spindle, means to rotate said spindle, an axially movable spindle support, an axially movable sleeve enclosing the spindle support, means for moving said spindle support in said sleeve, a guide block rotatably supported by the sleeve, a tool carrier supported by said guide block and shiftable in a plane intersecting the axis of said drill spindle, means for rotating said guide block by the rotation of said spindle, means for shifting said tool carrier in said guide block by the axial movement of said spindle carrier, means for longitudinally shifting said guide block by axial movement of said sliding sleeve, a source of power, means for rotating said spindle from said source of power, means for axially moving said spindle support and sleeve from said source of power, means for axially moving said spindle support independent of the movement of said sleeve, and means for regulating said source of power by the predetermined position of said spindle support.

RALPH HODGES.
JOHN H. KLASEY.